(12) United States Patent
Matzen

(10) Patent No.: US 10,945,425 B2
(45) Date of Patent: Mar. 16, 2021

(54) ANIMAL TRAP

(71) Applicant: The Rickey Mouse Company, LLC, Carefree, AZ (US)

(72) Inventor: Tracy M. Matzen, Carefree, AZ (US)

(73) Assignee: The Rickey Mouse Company, LLC, Carefree, AZ (US)

( * ) Notice: Subject to any disclaimer, the term of this patent is extended or adjusted under 35 U.S.C. 154(b) by 677 days.

(21) Appl. No.: 15/683,142

(22) Filed: Aug. 22, 2017

(65) Prior Publication Data

US 2019/0059353 A1    Feb. 28, 2019

(51) Int. Cl.
   *A01M 23/04*     (2006.01)
   *A01M 31/00*     (2006.01)

(52) U.S. Cl.
CPC .......... *A01M 23/04* (2013.01); *A01M 31/008* (2013.01)

(58) Field of Classification Search
CPC ...... A01M 23/04; A01M 23/06; A01M 23/02; A01M 23/08; A01M 23/14
USPC .......................................... 43/69–72, 74, 64
See application file for complete search history.

(56) References Cited

U.S. PATENT DOCUMENTS

| | | | | |
|---|---|---|---|---|
| 76,289 A * | 3/1868 | Starr | ..................... | A01M 21/00 43/70 |
| 146,284 A * | 1/1874 | Schweizer | ............ | A01M 23/04 43/69 |
| 585,045 A * | 6/1897 | Pelton | ................... | A01M 23/04 43/69 |
| 1,272,974 A * | 7/1918 | Lycan | ................... | A01M 23/04 43/69 |
| 1,420,384 A * | 6/1922 | Humbert | ............... | A01M 23/04 43/69 |

(Continued)

FOREIGN PATENT DOCUMENTS

| | | | | |
|---|---|---|---|---|
| CH | | 672709 A5 * | 12/1989 | ............ A01M 23/06 |
| DE | | 351978 C * | 4/1922 | ............ A01M 23/06 |

(Continued)

OTHER PUBLICATIONS

Matthias Wandel, "Building a better mouse trap, with video surveillance", Woodgears.ca, Aug. 10, 2017, https://web.archive.org/web/20170810032052/http://woodgears.ca/farm/mousetrap.html.

(Continued)

*Primary Examiner* — Darren W Ark
(74) *Attorney, Agent, or Firm* — Woods Oviatt Gilman LLP; Ronald J. Kisicki, Esq.

(57) ABSTRACT

An animal trap apparatus is mounted onto a rim of a bucket and comprises a plank having a bait receiving end and a mounting end, with a fulcrum feature therebetween. A bracket with a notch is received by the rim of the bucket while a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end extends over the cavity of the bucket. In use, the plank is configured to pivot about the fulcrum feature in a forward direction when an animal approaches the bait receiving end thereby placing the animal trap apparatus in a tripped condition whereby the bait receiving extends downwardly toward the closed bottom of the bucket and the animal falls into the cavity.

10 Claims, 6 Drawing Sheets

(56) References Cited

U.S. PATENT DOCUMENTS

| | | | | |
|---|---|---|---|---|
| 1,466,178 A * | 8/1923 | Severin | A01M 23/06 | 43/69 |
| 1,500,525 A * | 7/1924 | Humbert | A01M 23/04 | 43/69 |
| 1,520,557 A * | 12/1924 | Berg | A01M 23/06 | 43/69 |
| 1,552,855 A * | 9/1925 | Jenkins | A01M 23/00 | 43/69 |
| 1,831,688 A * | 11/1931 | Snider | A01M 23/04 | 43/70 |
| 1,889,276 A * | 11/1932 | Dorrien | A01M 23/18 | 43/69 |
| 2,122,147 A * | 6/1938 | Lamp | A01M 23/04 | 43/67 |
| 2,619,765 A * | 12/1952 | Sees | A01M 23/12 | 43/64 |
| 2,741,866 A * | 4/1956 | Shirley | A01M 23/04 | 43/69 |
| 2,825,995 A * | 3/1958 | Snider | A01M 23/06 | 43/69 |
| 2,850,835 A * | 9/1958 | Scheidegger | A01M 23/14 | 43/70 |
| 3,528,191 A * | 9/1970 | Hand | A01M 23/10 | 43/64 |
| 3,936,972 A * | 2/1976 | Meyers | A01M 23/04 | 43/69 |
| 4,662,101 A * | 5/1987 | Fisher | A01M 23/04 | 43/69 |
| 4,706,408 A * | 11/1987 | Mellard | A01M 23/04 | 43/69 |
| 4,876,821 A * | 10/1989 | Benzie | A01M 23/04 | 43/69 |
| 5,517,784 A * | 5/1996 | Sedore | A01M 23/04 | 43/64 |
| 5,528,852 A * | 6/1996 | Sarff | A01M 23/10 | 43/64 |
| 5,611,171 A | 3/1997 | Hershey | | |
| 5,996,274 A * | 12/1999 | Smith | A01M 23/10 | 43/64 |
| 6,739,086 B1 | 5/2004 | Lamb | | |
| 7,627,981 B1 * | 12/2009 | Doster | A01M 23/10 | 242/599.1 |
| 8,186,098 B1 * | 5/2012 | Wilson | A01M 23/06 | 119/751 |
| 10,264,780 B1 * | 4/2019 | Geesey | A01M 23/04 | |
| 10,383,325 B2 * | 8/2019 | Moga | A01M 23/10 | |
| 2006/0026893 A1 * | 2/2006 | Sears | A01M 23/04 | 43/69 |
| 2007/0017148 A1 * | 1/2007 | Blau | A01M 23/08 | 43/66 |
| 2010/0132244 A1 * | 6/2010 | Ridge | A01M 23/10 | 43/71 |
| 2019/0320642 A1 * | 10/2019 | Matzen | A01M 23/04 | |

FOREIGN PATENT DOCUMENTS

| | | | | |
|---|---|---|---|---|
| DE | 29709597 U1 * | 8/1997 | | A01M 23/04 |
| DE | 102008033858 A1 | 1/2010 | | |
| DE | 102013007787 A1 * | 11/2014 | | A01M 23/04 |
| DE | 102013007787 A1 | 11/2014 | | |
| FR | 2038564 A5 * | 1/1971 | | A01M 23/04 |
| FR | 2563083 A1 * | 10/1985 | | A01M 23/06 |
| FR | 2582479 A1 * | 12/1986 | | A01M 23/04 |
| FR | 2753880 A1 * | 4/1998 | | A01M 23/04 |
| JP | 3160975 U * | 7/2010 | | |
| WO | WO-8800008 A1 * | 1/1988 | | A01M 23/04 |
| WO | WO-2014203166 A1 * | 12/2014 | | |

OTHER PUBLICATIONS

Plan Life, "Plank Mouse Trap—Humane Bucket Rat Traps—Walk the Plank Automatic Reset Mouse Killer for Mice & Other Pests & Rodents", Amazon.com, Aug. 20, 2017, https://www.amazon.com/PLAN-LIFE-Plank-Mouse-Trap/dp/B0747BDGMZ/ref=cm_cr_arp_d_product_top?ie=UTF8.

Shawn Woods, "The All Time Best Mouse Trap I Have Ever Tested. Walk the Plank Mouse Killer Trap in Action", Youtube.com, Jul. 2, 2018, https://www.youtube.com/watch?v=nsoVcrFyrF8&feature=youtu.be.

RiCKEY Mouse Co. LLC, "Teeter Totter Trap", www.tttrap.com, Sep. 2017, https://www.tttrap.com.

Lee W. Young, "PCT International Search Report", dated Dec. 7, 2018 for application No. PCT/US2018/45963, United States Patent and Trademark Office, Alexandria, Virginia.

Lee W. Young, "PCT Written Opinion", dated Dec. 7, 2018 for application No. PCT/US2018/45963, United States Patent and Trademark Office, Alexandria, Virginia.

* cited by examiner

ANIMAL TRAP

TECHNICAL FIELD

The present invention relates to animal traps; more particularly, to animal traps for use with open ended buckets; and most particularly, to non-lethal animal traps for use with standard sized buckets wherein the trap includes a plank and fulcrum feature configured to deposit an animal, such as for example a mouse or rat, within the bucket upon tipping of the plank wherein the components of the trap are designed to snap together without fasteners or tools.

BACKGROUND OF THE INVENTION

Traps have long been used to control rodent infestation. Typically, such traps may be segregated between lethal and non-lethal varieties, each possessing its own positives and negatives.

By way of example, one variety of lethal rodent traps may be generally described as spring traps. In this type of trap, a jaw or bar is spring-loaded to an open position. Bait is then placed within the opening in order to entice the rodent into the path of the jaw or bar. Once a rodent approaches the bait, the spring tension is released thereby causing the jaw or bar to snap to a closed position which crushes the rodent or breaks the rodent's neck or back. The dead rodent can then be discarded and the jaw/bar reset to trap another rodent. While effective at controlling rodent infestation, these lethal traps suffer significant drawbacks. First, the lethality of these traps may be upsetting or offensive to some members of the general population. Second, removal and resetting of the trap may require handling of the rodent or trap components directly contacted by the rodent. Such contact may enable spread of contagions, such as mites that may have been living on the rodent.

Alternative, non-lethal animal traps have also been developed as a purportedly "more humane" method of rodent control. Non-lethal animal traps generally employ a cage-like member that may be triggered so as to encapsulate an animal. In one alternative, the cage is suspended or propped above a piece of bait. Once the animal approaches the bait, the cage is lowered to thereby entrap the animal. In a second alternative, a stationary cage may include a one-way entry into the cage body. That is, the trap may be configured to receive bait within the cage such that an animal can then freely enter the cage to retrieve the bait. However, once inside the cage, the animal is prevented from exiting to trap due to the trap design. While not harming the animal, such traps must be monitored regularly to determine if an animal has been trapped. Failure to monitor the traps may cause trapped animals to slowly suffocate, starve or die of dehydration—all of which may be considered by some to be more inhumane than the substantially instantaneous death of the animal resulting from the above-referenced lethal traps. Also, failure to properly relocate a trapped animal may enable the trapped animal to re-infest the location.

It is also known to fashion a rodent trap using a pail or bucket to catch and trap the rodent. In this type of trap, a metal or wood platform strip is loosely laid across a lip of the pail or bucket so that an end of the strip is suspended over its opening. Bait is placed on the suspended end of the strip so that a rodent will traverse the strip to reach the bait. As the rodent progresses along the platform strip, the strip tips to drop the rodent into the pail or bucket. The deep sidewalls of the pail or bucket prevent the rodent from climbing or jumping out. If desired, the captured rodent can then be released. Heretofore, these traps have been subject to a number of potential drawbacks. For instance, objects external to the pail or bucket must be used to properly place the strip in reference to the pail or bucket. Also, when the strip is loosely placed on the lip of the pail or bucket, care must be taken not to disturb the set up so as to avoid upsetting the balance of the strip. Further, activity of the rodent as it approaches the strip or bait may upset the balance as well. Additionally, these traps may be single-use traps whereby only a single rodent may be trapped before requiring manual resetting of the platform and/or bait.

Accordingly, what is needed in the art is an animal trap which addresses the above recited limitations in the art.

SUMMARY OF THE INVENTION

Briefly described, an animal trap apparatus is designed with simple molded parts that may be assembled without fasteners, tools or glue. The animal trap apparatus may be configured to be mounted onto a rim of a bucket where the bucket has a sidewall and closed bottom defining a cavity for receiving an animal. The animal trap apparatus may comprise a plank having a top surface, a bottom surface and opposing sides. The plank may further include a bait receiving end and a mounting end, with a fulcrum feature therebetween. A bracket having a notch may be adapted to receive the rim of the bucket to thereby mount the bracket on the bucket. The bracket may also include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end extends over the cavity of the bucket. Thus, the plank is configured to pivot about the fulcrum feature in a forward direction when an animal approaches the bait receiving end to thereby place the animal trap apparatus in a tripped condition whereby the bait receiving end is in a tripped position and extends downwardly toward the closed bottom of the bucket. In this manner, the animal may be deposited within the bucket. Additionally, the notch may be configured to include a stepped profile adapted to receive bucket rims of varying thicknesses. Further, the position of the plank may be biased toward the loaded position by a spring.

In an aspect of the present invention, the bracket included within the animal trap apparatus may comprise opposing first and second side panels where each side panel defines a respective receiving feature and a respective notch. The side panels may further define a bait receiving end slot and a mounting end slot arranged on either side of each panel's respective notch. The bracket may also include opposing first and second end braces where each end brace has first and second grooves. The first and second grooves of the first end brace may be configured to be received within respective bait receiving end slots of the first and second side panels. The first and second grooves of the second end brace may be configured to be received within respective mounting end slots of the first and second side panels. In this manner, the first and second side panels may be arranged in parallel spaced relation to one another. Each slot may further include a ledge configured to lockingly receive the end brace. The second end brace may also include an upwardly extending tongue portion configured to minimize or prevent reverse pivoting of the plank in an opposing reverse direction when the animal trap apparatus is in the loaded position.

In a further aspect of the invention, the fulcrum feature may comprise a pair of opposing posts, a respective post extending outwardly from a respective plank side. The posts are configured to pivotally reside within the notch of the side panels. The posts may be positioned toward the bait receiving end proximate the median of the plank and the bait receiving end may be configured to receive a bait without pivoting in the first direction when the animal trap apparatus is in the loaded position. The plank may further autonomously reverse pivot in an opposing second direction to return the animal trap apparatus to the loaded condition after the plank has pivoted to the tripped position.

A further embodiment of an animal trap apparatus may comprise a plank having a top surface, a bottom surface and opposing sides with the plank including a bait receiving end and a mounting end and a fulcrum feature therebetween. The bait receiving end may be loaded with a bait. A bracket having a notch may be adapted to receive the rim of the bucket to thereby mount the bracket on the bucket. The bracket may further include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end and bait extends over the cavity of the bucket. The plank is configured to pivot about the fulcrum feature in a forward direction when an animal approaches the bait thereby placing the animal trap apparatus in a tripped condition whereby the bait receiving end is in a tripped position and extends downwardly toward the closed bottom of the bucket. In this manner, the animal is deposited within the bucket.

In a further aspect of the present invention, the bait may be fixedly secured to the top face of the plank whereby the bait does not become dislodged when the plank is in the tripped position. The plank may then autonomously reverse pivot in an opposing second direction to return the animal trap apparatus to the loaded condition after the plank has pivoted to the tripped position.

Yet another embodiment of an animal trap apparatus may comprise a bucket including a sidewall having an open top edge defined by a rim and a closed bottom, the sidewall and closed bottom defining a cavity for receiving an animal. The apparatus may further include a plank having a top surface, a bottom surface and opposing sides where the plank includes a bait receiving end and a mounting end, with a fulcrum feature therebetween. A bracket having a notch adapted to receive the rim of the bucket to thereby mount the bracket on the bucket may be included. The bracket may further include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end extends over the cavity of the bucket. The plank may then be configured to pivot about the fulcrum feature in a forward direction when an animal approaches the bait receiving end thereby placing the animal trap apparatus in a tripped condition whereby the bait receiving end is in a tripped position and extends downwardly toward the closed bottom of the bucket. In this manner, the animal may be deposited within the bucket, such as a 5 gallon bucket.

In yet a further embodiment in accordance with the invention a method of assembling an animal trap apparatus is provided including the steps of:

providing trap parts including a plank, first and second side panels and first and second end braces;

connecting in any order the plank, first and second side panels and first and second end braces to form the animal trap apparatus.

In a further embodiment of the method of assembly, two or more of the traps parts are provided in the form of a parts rack followed by the step of removing two or more trap parts from the parts rack before connecting the two or more trap parts.

BRIEF DESCRIPTION OF THE DRAWINGS

The above-mentioned and other features are advantages of this invention, and the manner of attaining them, will become apparent and be better understood by reference to the following description of the invention in conjunction with the accompanying drawings, wherein.

DESCRIPTION OF THE PREFERRED
EMBODIMENTS

Figure 1:
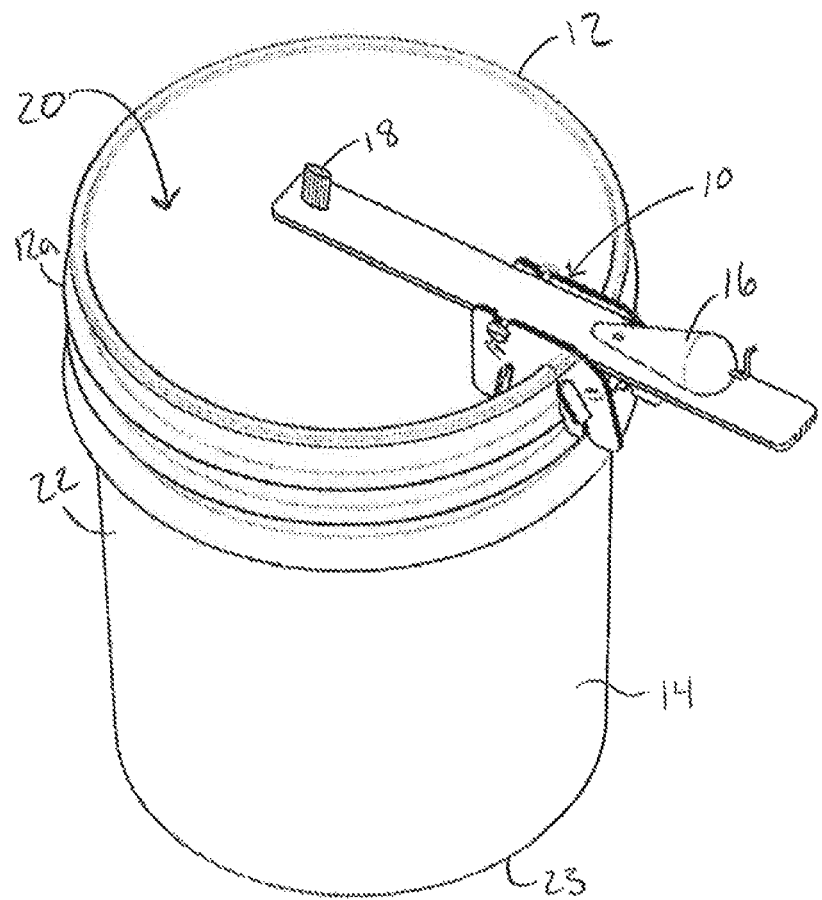
FIG. 1 is a perspective view of an embodiment of an animal trap apparatus in accordance with an aspect of the present invention, the animal trap apparatus being mounted onto a bucket.
Figure 2:
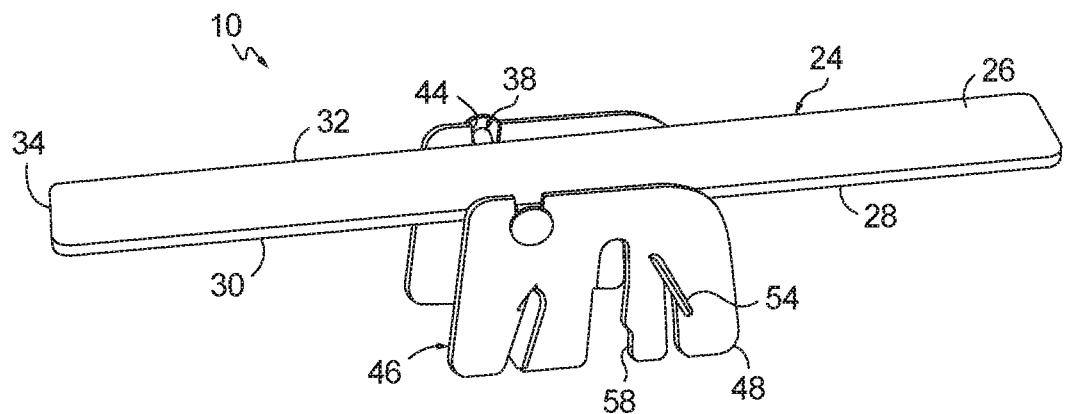
FIG. 2 is a perspective view of the animal trap apparatus shown in FIG. 1.

Referring to the drawings in detail, and specifically to FIG. 1, an animal trap apparatus 10 is shown that is designed with simple parts that may be assembled without fasteners, tools or glue. Animal trap apparatus 10 may be mounted onto a rim 12 of bucket 14. An animal 16, such as for example a mouse, may then attempt to retrieve bait 18 whereby animal 16 falls into, and is trapped within, cavity 20 defined by sidewall 22 and bottom 23 (see FIG. 8) of bucket 14, as will be discussed in greater detail below.

Figure 3:
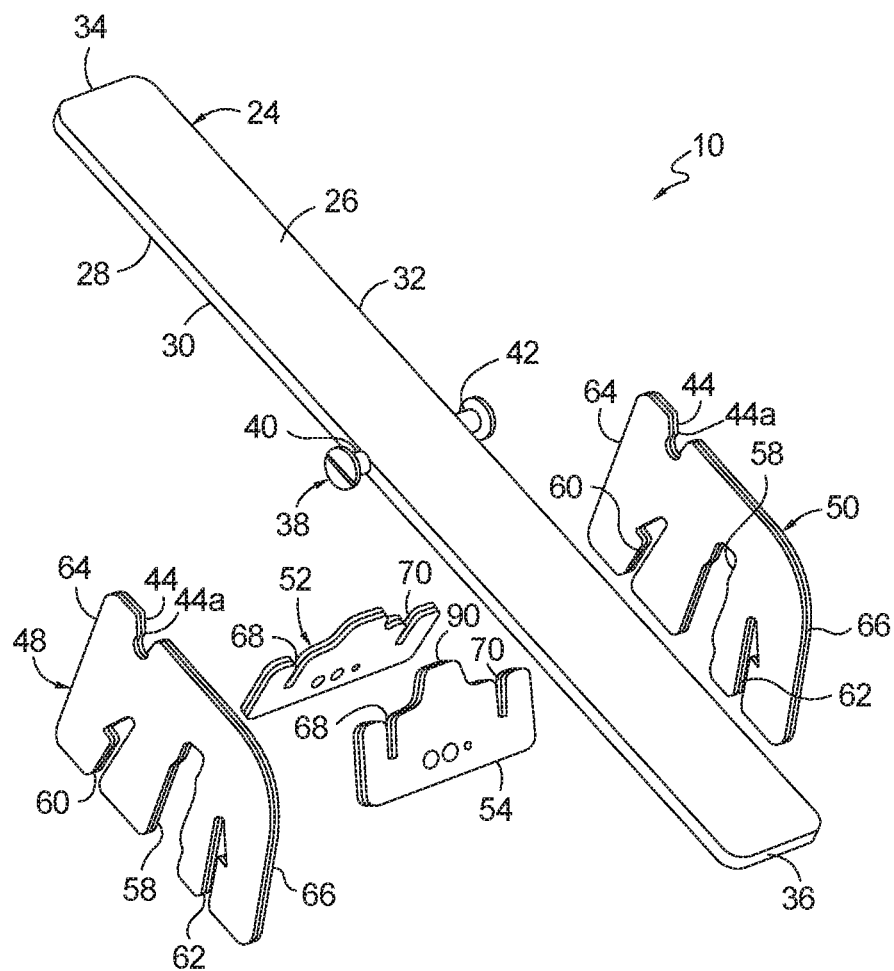
FIG. 3 is an exploded view of the animal trap apparatus shown in FIG. 2.
Figure 4:
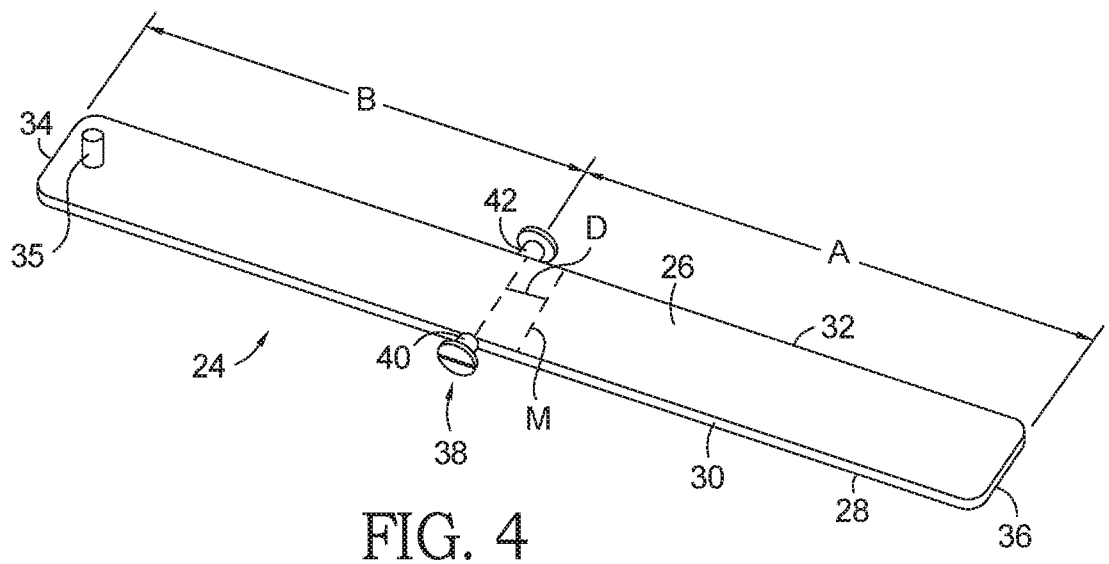
FIG. 4 is an isolated view of an embodiment of a plank used within the animal trap apparatus in FIG. 2.
Figure 7:
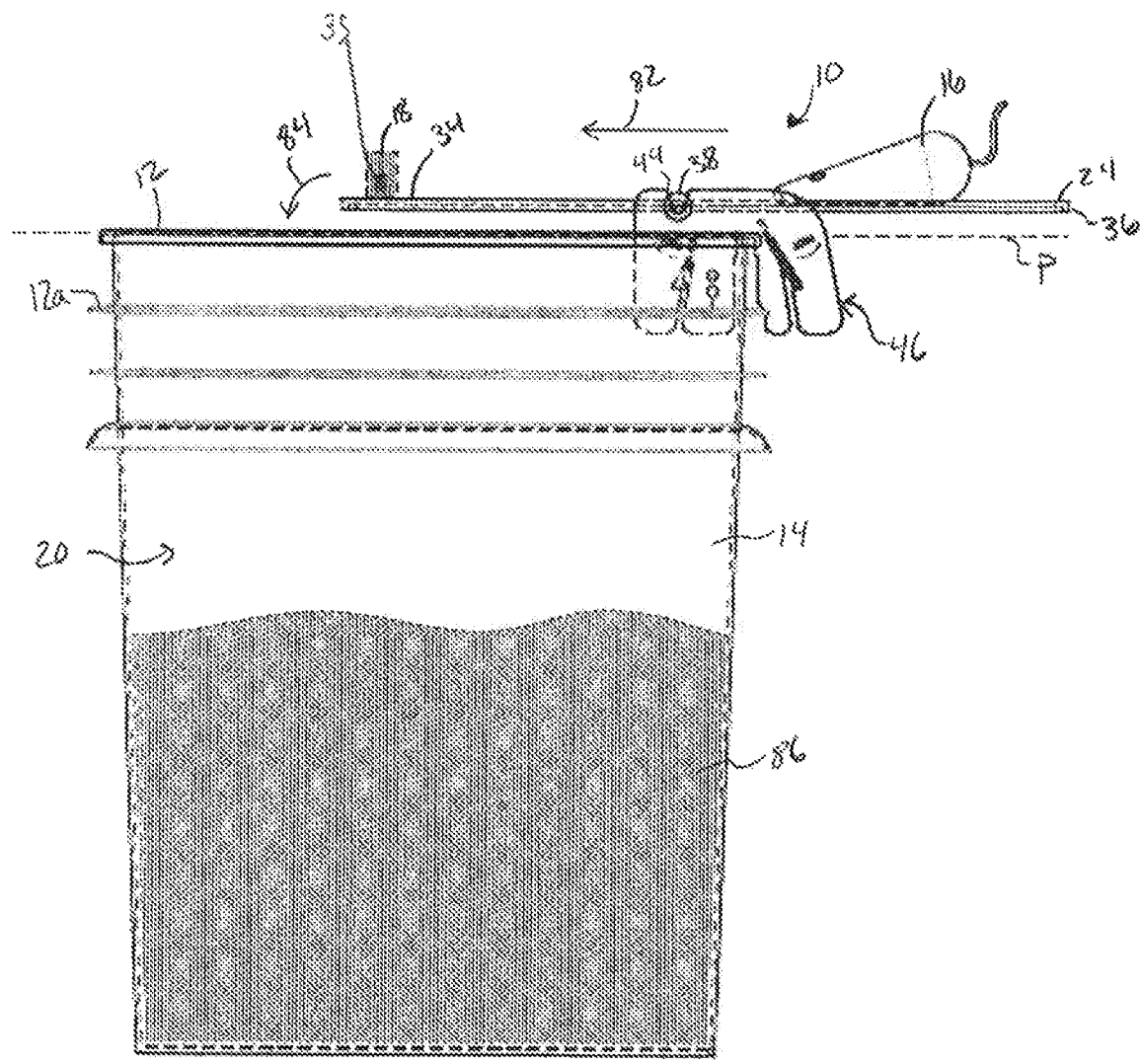
FIG. 7 is a side view of the animal trap apparatus shown in FIG. 1 mounted onto a bucket in a loaded condition with an animal at the mounting end of the plank and the bucket optionally filled with water.
Figure 8:
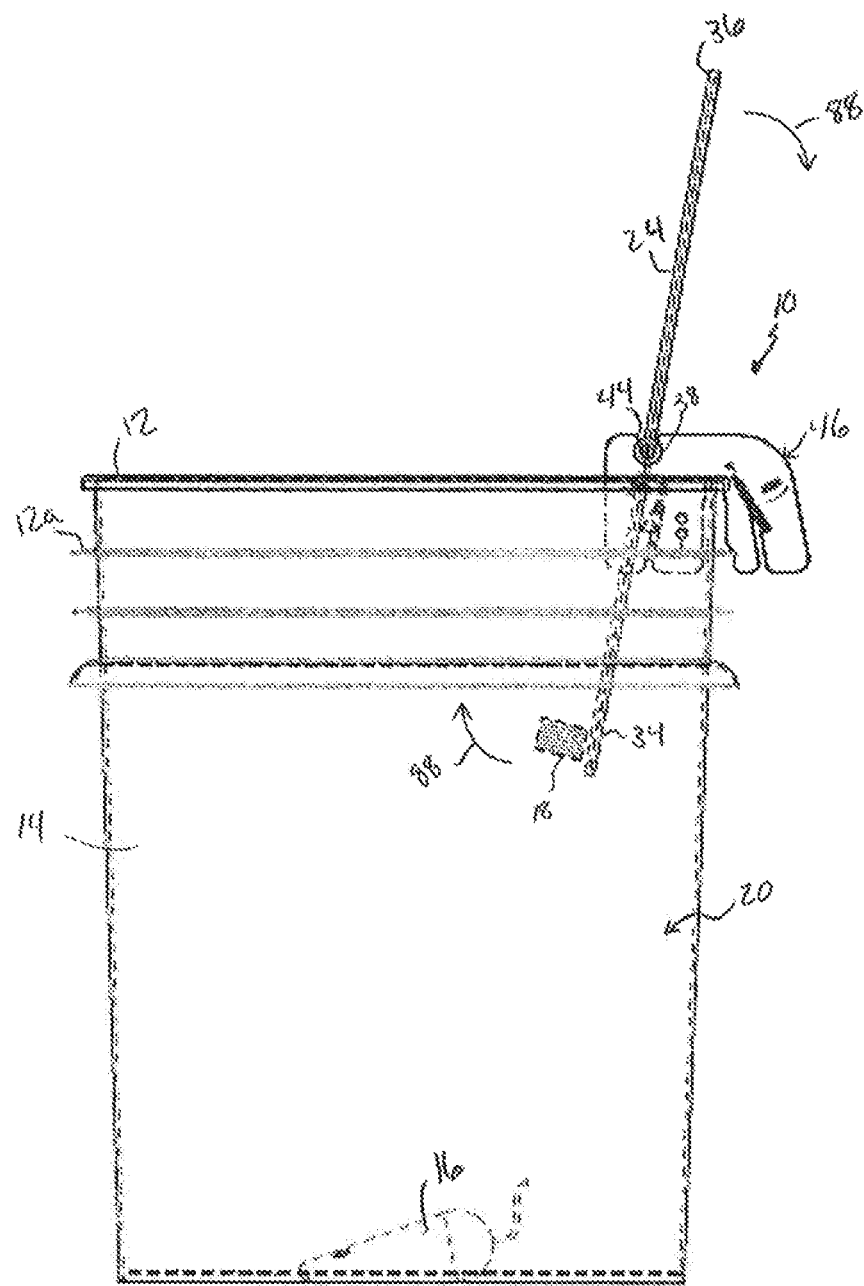
FIG. 8 is a side view of the animal trap apparatus shown in FIG. 1 mounted onto a bucket in a tripped condition with the plank tripped and the animal trapped within the empty bucket.

Turning now to FIGS. 2 through 6, animal trap apparatus 10 may be generally comprised of a plank 24 having a top surface 26, bottom surface 28 and opposing sides 30, 32. Plank 24 may further include a bait receiving end 34 and a mounting end 36, with a fulcrum feature 38 disposed therebetween. With reference to FIGS. 3 and 4, fulcrum feature 38 may comprise a pair of opposing posts 40, 42 extending outwardly from respective plank sides 30, 32. Posts 40, 42 of plank 24 may be configured to pivotally mount within a receiving feature 44 such as for example, a recess, on a bracket 46. Posts 40, 42 may also be positioned toward bait receiving end 34 a spaced distance D from plank median M (see FIG. 4) so that plank portion A weighs more than plank portion B when bait 18 is secured to receiving end 34 of plank 24 by bait securing feature 35 such as, for example, a pin extending from top surface 26 of plank 24. In this manner, and as discussed in greater detail below, when situated generally horizontal, as shown in FIG. 7, plank 24 may autonomously reverse pivot to return plank 24 to a loaded position (as shown in FIG. 7) after plank 24 has pivoted to a tripped position (as shown in FIG. 8). Optionally, a spring (not shown) may be provided, such as a torsion spring imposed about one or both opposing posts 40, 42, to bias plank 24 toward the loaded position to further offset the weight of the secured bait.

Figure 5:
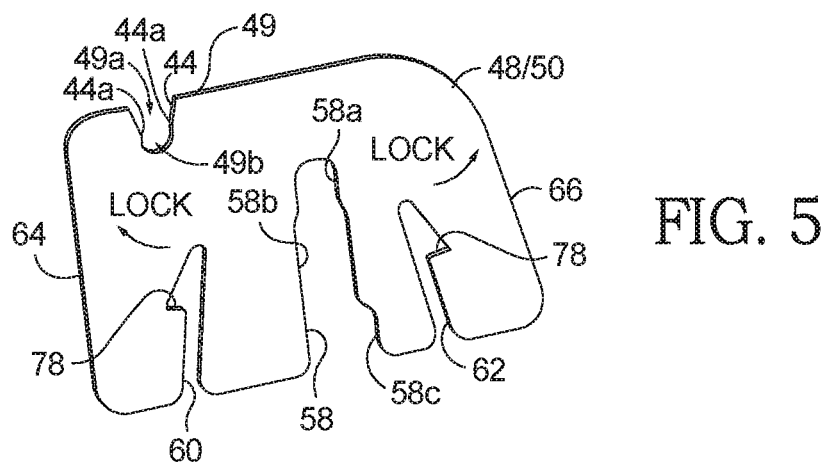
FIG. 5 is an isolated view of an embodiment of a side panel used within the animal trap apparatus in FIG. 2.
Figure 6:
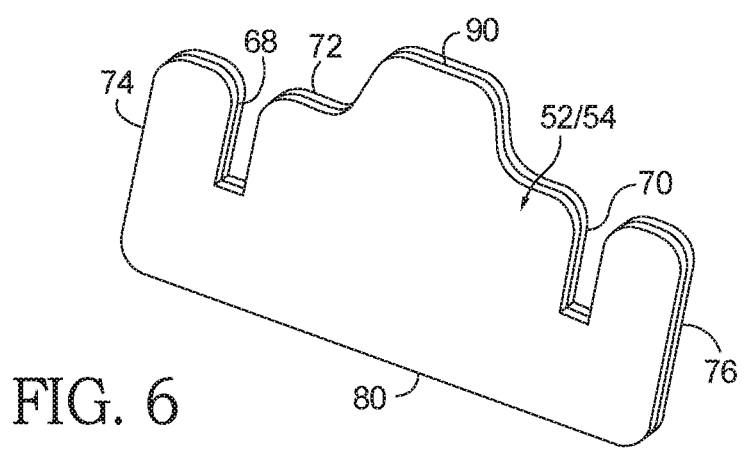
FIG. 6 is an isolated view of an embodiment of an end brace used within the animal trap apparatus in FIG. 2.

Bracket 46 as shown in FIGS. 3, 5 and 6, may be comprised of subcomponent parts (side panels 48, 50 and first and second end braces 52, 54) which may be assembled without tools to form a completed bracket 46. As seen most clearly in FIG. 3, and with further reference to FIG. 5, opposing first and second side panels 48, 50 each define a respective open ended receiving feature 44, open at edge 49 of each side panel 48, 50, and is configured to pivotally receive fulcrum feature 38 therein, as described above. In a further aspect of the present invention and with further reference to FIG. 9, receiving feature 44 may include one or more protrusions 44a proximate open edge 49. Protrusions 44a may partially occlude open edge 49 so as to form a narrowed opening 49a. Narrowed opening 49a is proportioned such that fulcrum feature 38 (e.g., posts 40, 42) must snuggly pass through narrowed opening 49a before coming to rest in post opening 49b. Posts 40, 42 may then freely pivot within a respective post opening 49b while protrusions 44a prevent unwanted removal or dislodgement of plank 24 from bracket 46. Each side panel 48, 50 may further define a respective notch 58 configured to receive rim 12 of bucket 14 so as to mount bracket 46 onto bucket 14. Notch 58 may include a stepped channel profile defining notches of varying widths, such as notches 58a-58c (see FIG. 5), so as to accommodate bucket rims of varying thickness and/or annular rings 12a formed on sidewall 22 (FIGS. 1, 7 and 8). Each side panel 48, 50 may also include a respective bait receiving end slot 60 and respective mounting end slot 62 proximate respective side panel edges 64, 66. Note that side panels 48, 50 may be identical in shape and size.

Opposing side panels 48, 50 may be generally arranged in spaced parallel relation to one another by way of a pair of opposing first and second end braces 52, 54. With reference to FIGS. 3 and 6, each end brace 52, 54 may include respective first and second grooves 68, 70 depending downwardly from brace top wall 72 proximate respective brace side edges 74, 76. In this manner, first end brace 52 may be configured to mount with side panels 48, 50 through a sliding engagement of grooves 68, 70 with bait receiving end slots 60 of each side panel 48, 50. Similarly, second end brace 54 may be configured to mount with side panels 48, 50 through a sliding engagement of grooves 68, 70 with mounting end slots 62 of each side panel 48, 50. Once assembled, side panels 48, 50 and end braces 52, 54 may generally form bracket 46 as a generally rectangular member. Each slot 60, 62 within side panels 48, 50 may be further configured to define a ledge 78 within side panels 48, 50. End braces 52, 54 may be configured to rotate within slots 60, 62 such that bottom edge 80 of each end brace 52, 54 is lockingly received by the respective ledge 78 (see e.g., FIGS. 2, 7 and 8). Note that end braces 52, 54 may be identical in shape and size.

Operation of an embodiment of animal trap apparatus 10 is shown generally in FIGS. 7 and 8. As shown in FIG. 7, once assembled, bracket 46 of animal trap apparatus 10 and plank 24 are mounted onto rim 12 of bucket 14 so as to place animal trap apparatus 10 in a loaded condition. That is, fulcrum feature 38 of plank 24 is mounted into receiving feature 44 of bracket 46 such that plank 24 rests in a generally horizontal plane with respect to the ground. With bucket 14 placed on a relatively flat, level surface, plank 24 may rest in a parallel relationship with the plane P defined by rim 12. Bait 18 may be secured to plank 24 proximate the terminal end of bait reciting end 34. As described above, fulcrum feature 38 may be positioned along the length of plank 24 so as maintain the horizontal orientation of plank 24 upon charging of bait 18. Animal 16 may then mount plank 24 at mounting end 36 and proceed in a forward direction generally designated by direction 82 toward bait 18. As animal 16 continues in direction 82 and travels past fulcrum feature 38, plank 24 pivots about fulcrum feature 38 in a forward direction generally designated by arrow 84 to place animal trap apparatus in a tripped condition, and plank 24 in a tripped position, as shown in FIG. 8. With plank 24 in the tripped position, animal 16 falls from plank 24 into cavity 20 of bucket 12. Bucket 12 may either be filled with water 86 (FIG. 7) or left empty (FIG. 8) at the discretion of the trap apparatus user.

As shown in FIG. 8, after animal 16 has fallen into bucket 12, plank 24 may autonomously reverse pivot generally in the direction designated by arrow 88 until plank 24 is returned to the loaded position and animal trap apparatus 10 to the loaded condition as shown in FIG. 7. As further shown in FIG. 8, in accordance with an aspect of the present invention, bait 18 may be fixedly secured to bait receiving end 34 such that bait 18 remains on plank 24 and does not fall into cavity 20 when plank 24 pivots to the tripped position. In this manner, animal trap apparatus 10 may autonomously cycle between loaded and tripped conditions upon mounting of serial animal 16. It should be further noted that plank 24 may be prevented from pivoting in reverse direction 88 past plane P (FIG. 7) upon mounting of animal 16 through an interference between plank 24 and rim 12. Additionally or alternatively, second end brace 54 may further include an upwardly extending tongue portion 90 (see FIGS. 3 and 6) that may engage with bottom surface 28 of plank 24 proximate mounting end 36 to minimize or prevent reverse pivoting of plank 24 in direction 88 beyond plane P as shown in FIG. 7. Note that, for commonality of part design, both braces 52, 54 may include tongue 90.

It should be noted that the animal trap as herein described is scalable. That is, while depicted as a trap for small animals such as mice, the individual trap parts may be sized as needed to be assembled as an animal trap for larger animals such as rats, squirrels, raccoons, etc. Once bracket 46 is assembled with its separate components 48, 50, 52 and 54, it becomes a structurally rigid assembly.

Figure 9:
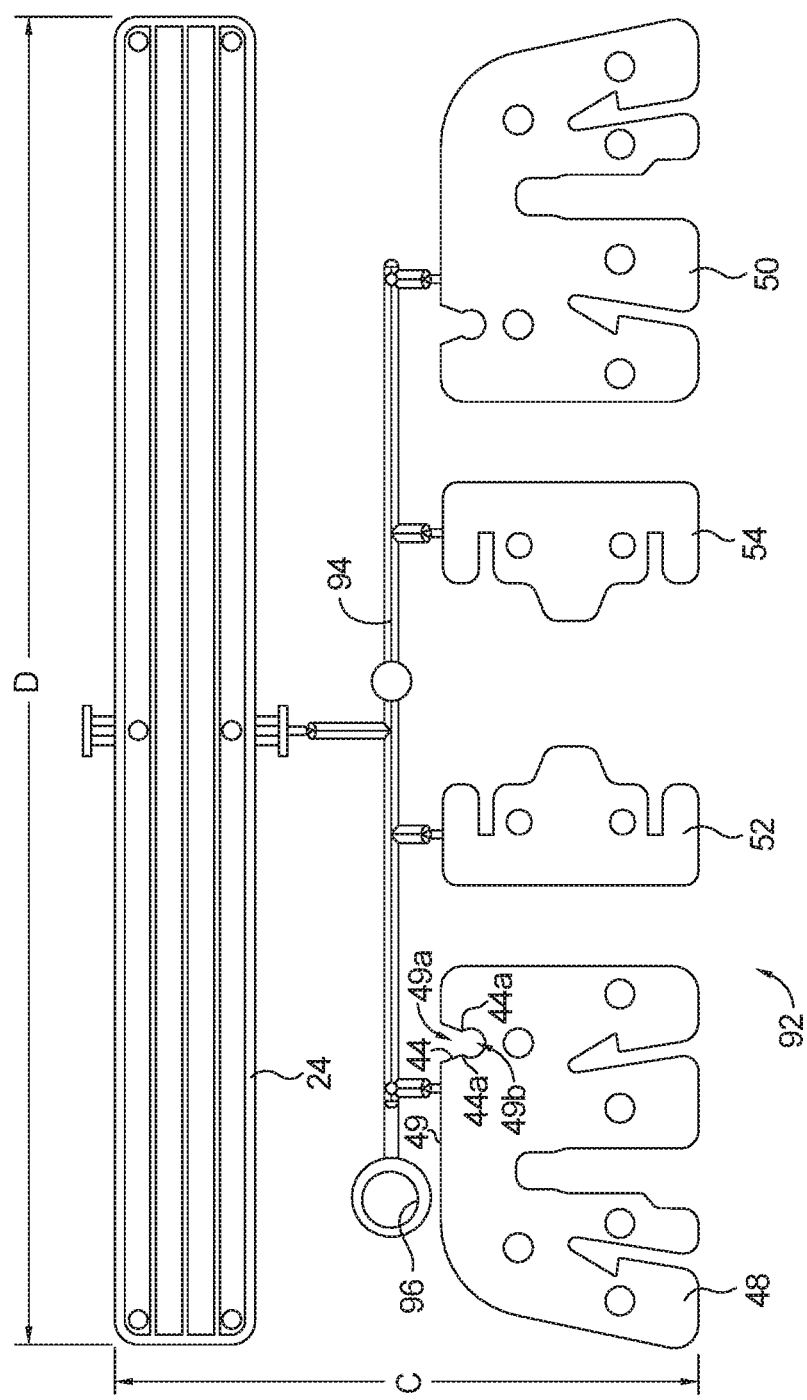
FIG. 9 is a side view of a trap parts rack containing the parts of the animal trap apparatus shown in FIG. 1 in accordance with the invention.

With respect to the overall configuration of the parts that comprise trap apparatus 10, each part may be molded of plastic or other light weight material, one or more of the parts being connected together into a rack by molding sprues for compact packaging and storage. Referring to FIG. 9, an exemplar trap parts rack 92 containing all of the parts needed to compete assembly of trap apparatus 10 are shown. Trap parts rack 92 includes plank 24, side panels 48, 50 and end braces 52, 54, all connected together by molding sprue 94 to form parts rack 92. Trap parts rack 92 thus provides for compact packaging for shipping and storage purposes. For example, parts rack 92 formed to provide the parts for an animal trap apparatus suitable for trapping mice, dimension C may be approximately less than 6¼ inches and dimension D may be approximately less than 13¼ inches. The thickness of the molded parts may be selected to provide the strength and rigidity needed of the trap apparatus to perform its function. In the case of an apparatus suitable for trapping mice, the thickness of the formed rack may be approximately less than ½ inch. Optional end hook 96 may be contiguously formed with rack 92 to provide a convenient way to feature the trap apparatus in a commercial setting or to hang on a hook or nail on a wall ready for use.

A method of assembling animal trap apparatus in accordance with the invention may include the steps of:
  providing trap parts 24, 48, 50, 52 and 54;
  connecting in any order trap parts 24, 48, 50, 52 and 54 to form animal trap apparatus 10.
In a further embodiment of the method of assembly, two or more of trap parts 24, 48, 50, 52 and 54 may be provided in the form of a parts rack (see FIG. 9 where an exemplar rack containing all trap parts is shown as parts rack 92) followed by the step of removing two or more trap parts from the parts rack before connecting the two or more trap parts.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In an animal trap apparatus having a plurality of components wherein said plurality of components are configured to snap together to form said animal trap apparatus, said plurality of components comprising:
  a) a plank having a bait receiving end and a mounting end, with a fulcrum feature therebetween; and
  b) a bracket including receiving features having open ends, wherein said bracket further comprises opposing first and second side panels and first and second end braces, wherein each of the side panels includes the respective receiving feature configured to receive said fulcrum feature of said plank, and wherein the first and second end braces are configured to be mounted to the first and second side panels without requiring tools or fasteners,
  wherein each of the side panels of said bracket includes first and second end slots and each of the end braces includes first and second grooves, wherein the first and second end slots of said first side panel are configured to receive the respective first grooves of said first and second end braces and wherein the first and second end slots of said second side panel are configured to receive the respective second grooves of said first and second end braces, and
  wherein said plank is configured to pivot about the fulcrum feature in a forward direction from a plank loaded position to a plank tripped position.

2. The animal trap apparatus in accordance with claim 1 wherein said open ends of said receiving features each include a protrusion partially occluding an opening of said open end wherein, upon receiving said fulcrum feature, said fulcrum feature snuggly passes said protrusion and wherein said protrusion is configured to prevent unwanted removal of said plank from said bracket.

3. The animal trap apparatus in accordance with claim 1 wherein at least one of said first and second end braces includes an upwardly extending tongue portion configured to prevent reverse pivoting of the plank in an opposing reverse direction when the animal trap apparatus is in the loaded position.

4. The animal trap apparatus in accordance with claim 1 wherein each of the end slots further includes a ledge configured to lockingly receive the respective end brace.

5. The animal trap apparatus in accordance with claim 1 wherein said fulcrum feature includes a post extending outwardly from said plank wherein said post is configured to pivotally reside within said receiving feature.

6. An animal trap apparatus configured to be mounted onto a rim of a bucket, the bucket having a sidewall defining a cavity for receiving an animal, the animal trap apparatus comprising:
  a) a plank having a top surface, a bottom surface and opposing sides, the plank including a bait receiving end and a mounting end, with a fulcrum feature therebetween; and
  b) a bracket comprising opposing first and second side panels, wherein each of the side panels includes an edge and a receiving feature, wherein each of the receiving features is open at the respective edge of the respective side panel, wherein each of the receiving features is configured to receive the fulcrum feature, and
  wherein each of the side panels includes a notch adapted to receive the rim of the bucket to thereby mount the bracket on the bucket; wherein each of the side panels includes a first and second end slot arranged on either side of said respective notch; and wherein said bracket further comprises opposing first and second end braces, each of the end braces having first and second grooves, the first and second grooves of the first end brace configured to be received within the respective first end slots of the first and second side panels, the first and second grooves of the second end brace configured to be received within the respective second end slots of the first and second side panels wherein the first and second side panels are arranged in spaced relation to one another, and
  wherein the plank is configured to pivot about the fulcrum feature in a forward direction from a plank loaded position to a plank tripped position.

7. The animal trap apparatus in accordance with claim 6 wherein each of the slots further includes a ledge configured to lockingly receive the respective end brace.

8. The animal trap apparatus in accordance with claim 6 wherein at least one of said first and second end braces includes an upwardly extending tongue portion configured to prevent reverse pivoting of the plank in an opposing reverse direction when the animal trap apparatus is in the loaded position.

9. The animal trap apparatus in accordance with claim 6 wherein the fulcrum feature comprises a pair of opposing posts, the respective post extending outwardly from the respective plank side, the posts configured to pivotally reside within said bracket receiving features.

10. The animal trap apparatus in accordance with claim 6 wherein the notch in each of said side panels is configured to include a stepped profile adapted to receive bucket rims of varying thicknesses.

* * * * *